United States Patent
Bakowski et al.

(10) Patent No.: US 10,169,214 B2
(45) Date of Patent: *Jan. 1, 2019

(54) TESTING OF COMBINED CODE CHANGESETS IN A SOFTWARE PRODUCT

(71) Applicant: International Business Machines Corporation, Armonk, NY (US)

(72) Inventors: Ben Bakowski, Romsey (GB); Richard Coppen, Southampton (GB)

(73) Assignee: International Business Machines Corporation, Armonk, NY (US)

(*) Notice: Subject to any disclaimer, the term of this patent is extended or adjusted under 35 U.S.C. 154(b) by 185 days.

This patent is subject to a terminal disclaimer.

(21) Appl. No.: 15/398,808

(22) Filed: Jan. 5, 2017

(65) Prior Publication Data

US 2017/0116106 A1    Apr. 27, 2017

Related U.S. Application Data

(63) Continuation of application No. 14/464,960, filed on Aug. 21, 2014, now Pat. No. 9,582,403.

(30) Foreign Application Priority Data

Aug. 29, 2013   (GB) .................................. 1315366.3

(51) Int. Cl.
 *G06F 11/36*        (2006.01)
(52) U.S. Cl.
 CPC ........ *G06F 11/368* (2013.01); *G06F 11/3676* (2013.01)
(58) Field of Classification Search
 CPC ........................... G06F 11/368; G06F 11/3676

(Continued)

(56) References Cited

U.S. PATENT DOCUMENTS 6,393,437 B1    5/2002  Zinda et al.
8,677,348 B1 *  3/2014  Ramanathpura .......... G06F 8/65
                                                       717/175

(Continued)

FOREIGN PATENT DOCUMENTS

JP    2010067188    3/2010

OTHER PUBLICATIONS

Kagdi et al, "Mining software repositories for traceability links", Proc. 15th IEEE International Conference on Program Comprehension, 2007, pp. 145-154.

(Continued)

*Primary Examiner* — Li B. Zhen
*Assistant Examiner* — Zengpu Wei
(74) *Attorney, Agent, or Firm* — Law Office of Jim Boice (57) ABSTRACT

A method tests changesets in a software product. One or more processors determine whether there is sufficient building and testing capacity to test a single changeset individually. In response to determining that there is not sufficient building and testing capacity to test the single changeset individually, one or more processors: select a first combination of changesets; calculate an interaction between changesets in said each combination; determine that the first combination of changesets has a lower amount of overlapping of code than any other combination of changesets from the multiple changesets; and select the first combination of changesets for building and testing.

20 Claims, 4 Drawing Sheets

(58) Field of Classification Search
USPC .......................................................... 717/124
See application file for complete search history.

(56) References Cited

U.S. PATENT DOCUMENTS

| | | |
|---|---|---|
| 2004/0093476 A1 | 5/2004 | Thompson et al. |
| 2004/0154001 A1 | 8/2004 | Haghighat et al. |
| 2009/0292956 A1 | 11/2009 | Rivera et al. |
| 2010/0058294 A1 | 3/2010 | Best et al. |
| 2010/0169874 A1 | 7/2010 | Izard et al. |
| 2012/0023372 A1 | 1/2012 | Lin et al. |
| 2012/0023373 A1* | 1/2012 | Chen .................... G06F 11/368 |
| | | 714/38.11 |
| 2014/0372983 A1* | 12/2014 | Presley ................ G06F 11/368 |
| | | 717/124 |

OTHER PUBLICATIONS

Hendrickson et al., "Modeling Product Line Architectures through Change Sets and Relationships", Proc.29th International Conference on Software Engineering, IEEE, 2007, pp. 189-198.
IBM Corporation, "Rational Team Concert", IBM Corporation, jazz.net, retrieved Aug. 18, 2014, pp. 1-6.
List of IBM Patents or Patent Applications Treated as Related, Jan. 5, 2017, pp. 1-2.
U.S. Appl. No. 14/464,960 Non-Final Office Action dated April 13, 2015.
U.S. Appl. No. 14/464,960 Final Office Action dated Nov. 20, 2015.

* cited by examiner

TESTING OF COMBINED CODE CHANGESETS IN A SOFTWARE PRODUCT

BACKGROUND

This invention relates to the field of software testing. In particular, the invention relates to testing of combined code changesets in a software product.

One of the tenets of successful agile software development is "real time" verification.

A coder can build and test their own individual changeset $\Delta 1$ independently of other coders' changesets $\Delta 2$, $\Delta 3$, $\Delta 4$, ..., $\Delta n$. A changeset is a set of changes which should be treated as an distinct group (i.e., an atomic package, or multiple atomic packages) produced by a single developer source. A "real time" verification approach encourages better code quality upfront: as the coder gets feedback on his/her changeset alone, there is no room for doubt about the cause of regression failures.

In contrast, common development strategies where build and test follow a regular cadence (for example, once per day) commonly involve building and testing a "melting pot" of changes. These can interact in unusual ways leading to unexpected failures, and understandably coders do not want to duplicate effort investigating (potentially) someone else's problem. This culture unfortunately can lead to lower quality injected code and the need for full time roles to analyze builds and test results.

There are existing solutions to this problem. Known prior art provides the facility for coders to submit "private" builds containing only their changeset and, with a sufficiently powerful build engine definition, this can include appropriate regression test capability.

Unfortunately, many legacy software projects face major challenges. The product must often be built on multiple architectures and this relies on an extremely powerful and expensive regression capability built over many years. It is not possible to provide this "per $\Delta$" verification capability as the resource required to support it is orders of magnitude more than that available.

Some improvements may be gained by optimizing the build and test cycles to be as fast as possible. Techniques include: build only changed code; only run tests that exercise changed code. However, these techniques only work well for small changes and may not offer enough of a speed gain to reach the "build per changeset" goal.

Therefore, there is a need in the art to address the aforementioned problems.

SUMMARY

In accordance with one or more embodiments of the present invention, a method tests changesets in a software product. One or more processors determine whether there is sufficient building and testing capacity to test a single changeset individually, where a changeset is a set of changes to a software product. In response to determining that there is not sufficient building and testing capacity to test the single changeset individually, one or more processors: select a first combination of changesets from multiple changesets; calculate, for each combination of two or more changesets from the multiple changesets, an interaction between changesets in said each combination, where the interaction is an overlapping of code found in two or more changesets; determine that the first combination of changesets has a lower amount of overlapping of code than any other combination of changesets from the multiple changesets; and select the first combination of changesets for building and testing, where the first combination of changesets has the lower amount of overlapping of code than any other combination of changesets from the multiple changesets. One or more processors then build and test the first combination of changesets.

The present invention may also be implemented as a computer program product and/or as a computer system.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for testing a combination of two or more code changesets, with each changeset being a set of changes from a single developer source. The described method and system provide pseudo-independent code verification for a developer's changeset where actual real-time independent code verification cannot be performed or is too expensive to perform. The "pseudo-independent" code verification actually verifies a changeset together with one or more other changesets and not independently, but as the interaction of the changesets is minimized this has the outcome of being "pseudo-independent".

The described testing is designed to provide coders with early confidence that their changeset works "independently" of other changesets. Once this has been established, the changeset may be delivered to a "full" production stream, and built and tested using conventional technologies.

The described method aims to identify suitable combinations of changesets and to create a software build based on an analysis of overlap between the changesets. More specifically, an overlap between a two or more changesets comprised in the software build is minimized. The overlap may be identified based on code coverage, in particular using an overlap in test cases covering the two or more changesets in the combination.

Figure 1:
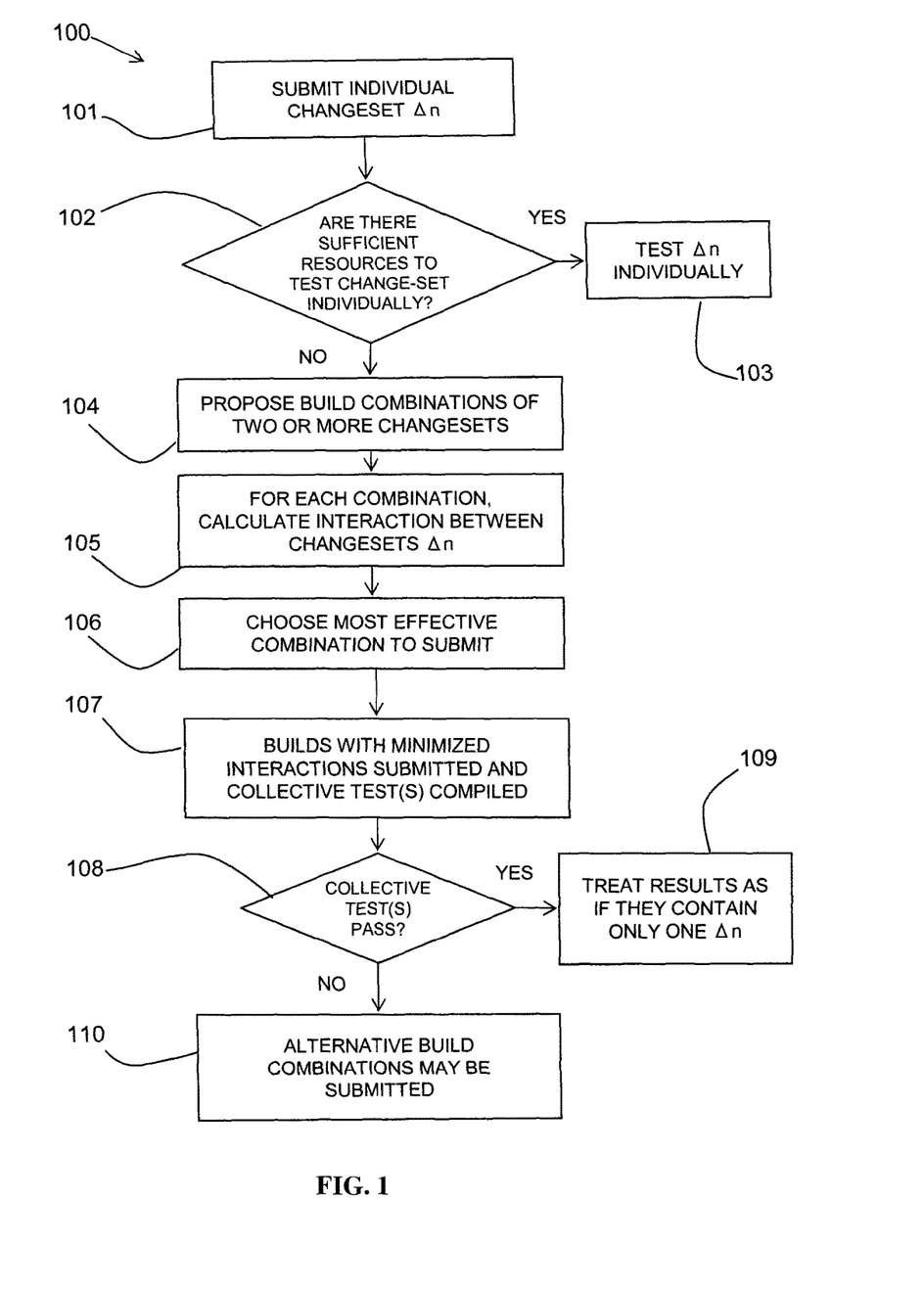
FIG. 1 is a flow diagram of an example embodiment of an aspect of a method in accordance with the present invention.

Referring to FIG. 1, a flow diagram 100 shows an embodiment of the described method.

Coders developing software submit 101 their individual changesets, Δn.

The method may understand the build and test engine capacity, and thus may include the step of determining 102 if there are sufficient resources to build and test changesets individually (for example, as per existing Rational Team Concert implementation). If there is sufficient capacity, the changeset Δn may be built and tested 103 individually.

If there is not sufficient capacity, the method may propose 104 build combinations of two or more changesets by comparing the available changesets Δn and determining appropriate build combinations. For example, build combinations may be C1=(Δ1, Δ2), C2=(Δ2, Δ3), etc.

For each combination of changesets, the interactions 105 between the contributing changesets Δn may be calculated.

The overlap or interactions may be determined through code coverage. An alternative embodiment may use expert opinion, or looking to see which source files have been updated.

Code coverage is a well-recognized tool and may be used to implement this step. Code coverage is a measure used in software testing. It describes the degree to which the source code of a program has been tested.

Code coverage tools may determine which tests cover a given code changeset. Code coverage is based on the definition "if the code coverage C that is executed by test-case TC does NOT overlap with the code changeset Δ, then the outcome of test-case TC is unaffected by changeset Δ". This statement is true for many changesets and forms the basis of many advanced testing techniques. The described method may use this definition of code coverage to provide a mechanism for determining whether changesets from different developers "overlap" and therefore potentially suffer from interaction defects.

In one embodiment, this may be carried out by determining a set of test cases that exercise each changeset and by determining an overlap of the test cases. For example, changeset Δ1 may be tested in TC1, TC2, TC3, changeset Δ2 may be tested in TC3, TC4, TC5; and build combinations may be C1=(Δ1, Δ2), C2=(Δ2, Δ3), etc.). In this case, combination C1 has an overlap O(C1) in test TC3.

The overlap data may be analyzed to decide 106 the most effective build combination to submit. The aim is to choose the most efficient pseudo-independent builds (i.e., with the lowest amount of overlap). The analysis may determine the minimum interaction of the changesets whilst also, optionally, considering the number of changesets in a combination to maximize the effectiveness of a combined build and test.

In the embodiment above, build combinations with no overlap of test cases (O(Cn)=null) may be submitted first. If there is an overlap in the test cases of a build combination, then there is a higher potential of overlap with another developer's changesets than if there is no overlap. The developer may therefore be alerted that "test failures may be caused by integration issues with changeset X from developer Y", so if they do see failures, they have a head start in what might be causing the issue.

Examples of criteria for selecting the build combination are given below.

In a first example criteria, a combination may be selected in which the aim is to: minimize the overlap in the combination and thereby have the best pseudo-independence; and maximize the number of changesets in the combination, so that there are fewer overall builds required. Each build costs money and time in waiting for results.

In general, the amount of overlap is expected to increase as the number of contributing changesets increases, so these appear mutually exclusive; however, in practice there will be some combinations that are better than others.

In a second example, combinations may be selected only where there is no overlap.

In a third example, two random changesets may be chosen and built as a combination. This embodiment does not choose a combination build intelligently, but will halve the costs of two independent builds.

Builds with combined changesets with minimized interactions may be submitted 107 and the collective set of appropriate test cases may be compiled spanning the multiple changesets Δn. Each test case may be added to the collective set that exercises at least one of the changesets.

If the test case exercises more than one changeset, then it is an integration test case as it potentially offers information on the integration of multiple changesets. Potential interactions between changesets Δn may be highlighted in an integration test. If there is an integration test that covers more than one changeset, a potential interaction may be flagged or tagged for the user.

It may be determined 108, if the collective set of test cases pass. Should the collective set of test cases pass, coders may treat 109 the resulting build/test results as if they contain only their changeset Δn.

If the collective set of test cases fail, alternative build combinations may be submitted 110, or the appropriate coders can work together to eradicate the integration issue.

As an enhancement, the integration test case(s) may be prioritized higher than tests that only test one changeset, and so give an early and fast indication of whether pseudo-independence has been achieved. The test case list may comprise integration test cases (those which exercise>1 changeset) and normal test cases (those that exercise just 1 changeset). It can be determined if the build really is pseudo-independent if the integration tests pass; therefore, the integration tests may be run first. This is in line with best practice to "run the most useful tests first".

Figure 2:
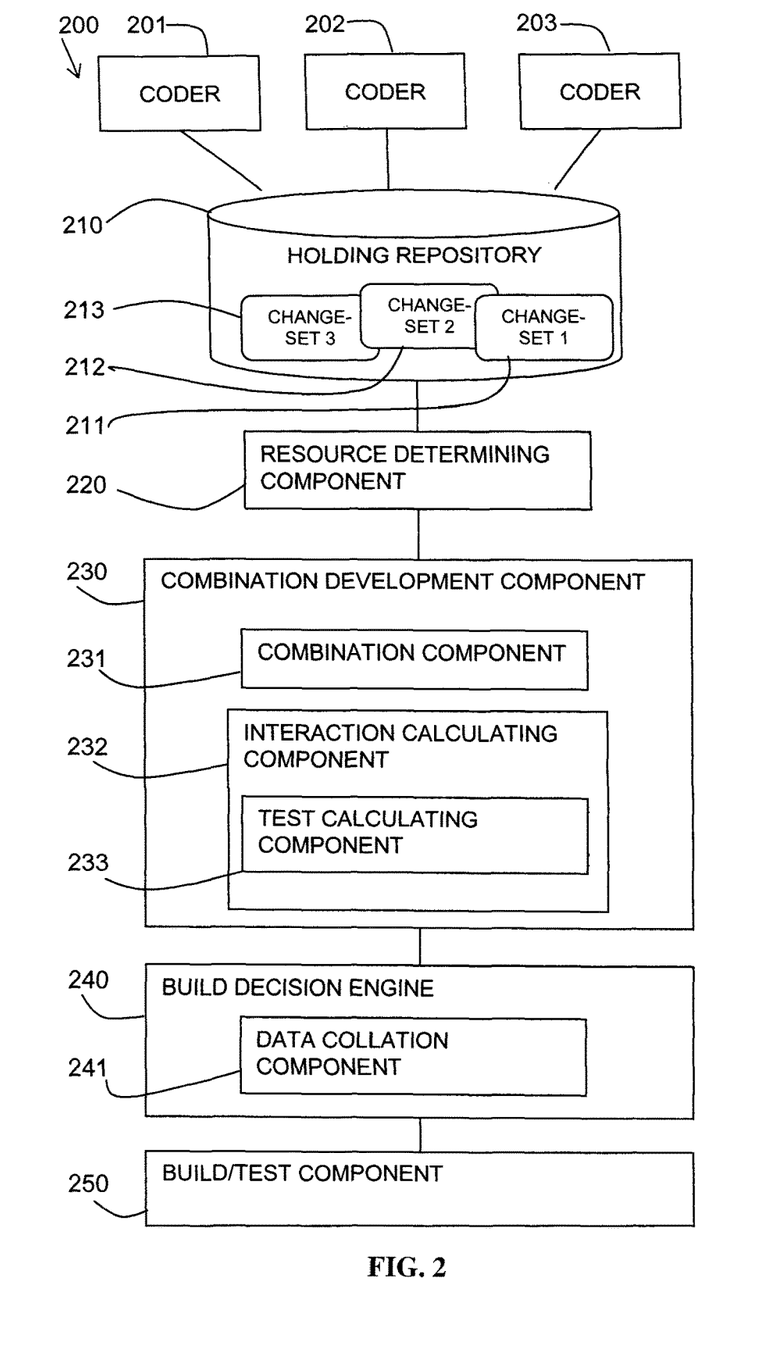
FIG. 2 is block diagram of an example embodiment of a system in accordance with the present invention.

Referring to FIG. 2, a block diagram shows an example embodiment of the described system 200.

Multiple code developers or coders 201, 202, 203 may feed code changes in the form of changesets 211, 212, 213 to a holding repository 210.

A resource determining component 220 may be provided for determining if there are sufficient resources to build and test changesets individually. If the resource determining component 220 determines that there are not sufficient resources to build and test changesets individually, it may activate a combination development component 230 for determining possible combinations of changesets for building and testing.

The combination development component 230 may include a combination component 231 for proposing possible combinations of changesets and an interaction calculating component 232 for determining the overlap or interaction between changesets in a combination. The interaction calculating component may include a test calculating component 233 for determining a set of test cases that exercise each changeset component and the overlap of test cases for each combination.

A build decision engine 240 may be provided including a data collation component 241 for collating and analyzing data relating to the interaction of changesets for each combination and determining the most appropriate build combination(s) to submit and test. This decision may be based on specified criteria such as the minimum overlap between combined changesets with a maximum number of contributing changesets.

A build and test component 250 may be provided for building the combined changesets and applying integrated test cases.

Figure 3:
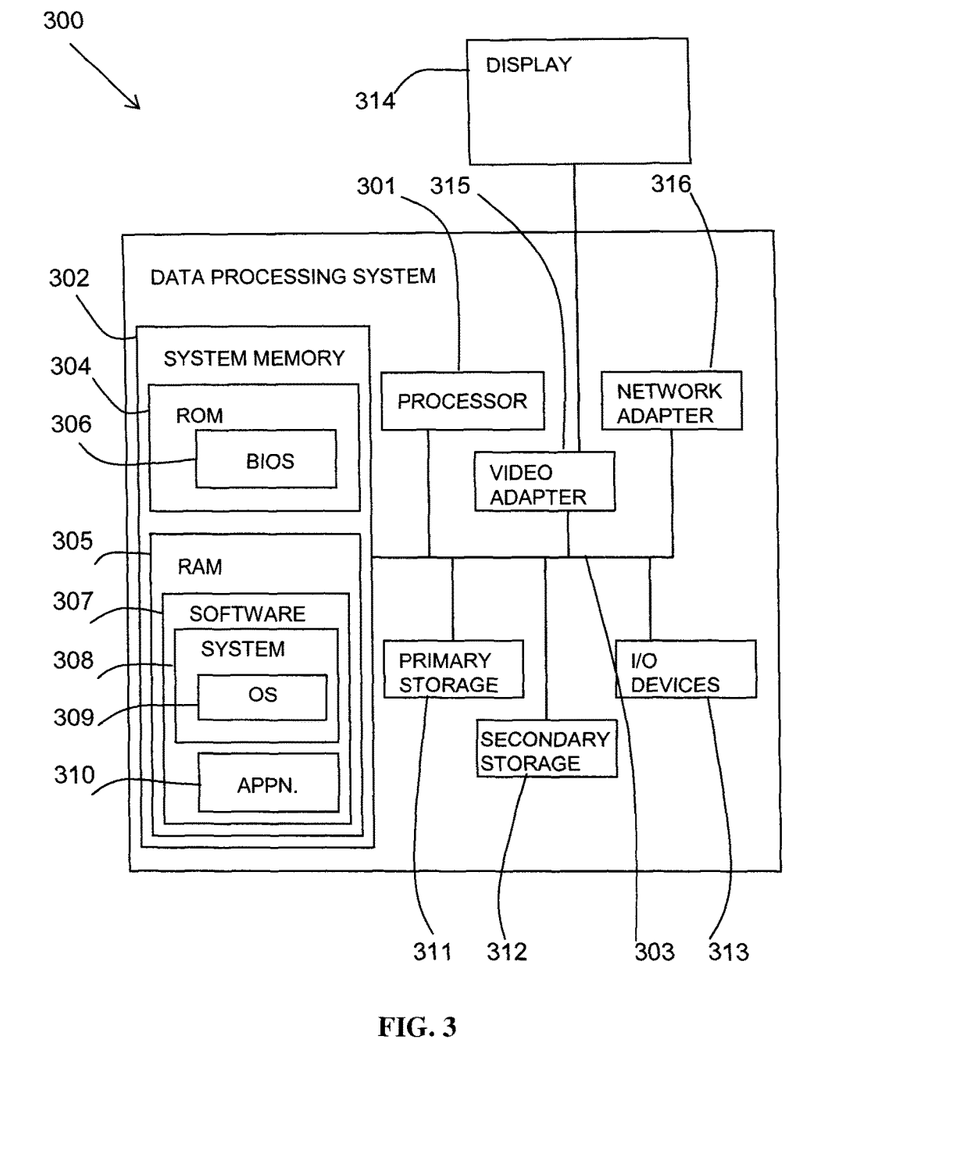
FIG. 3 is a block diagram of an embodiment of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
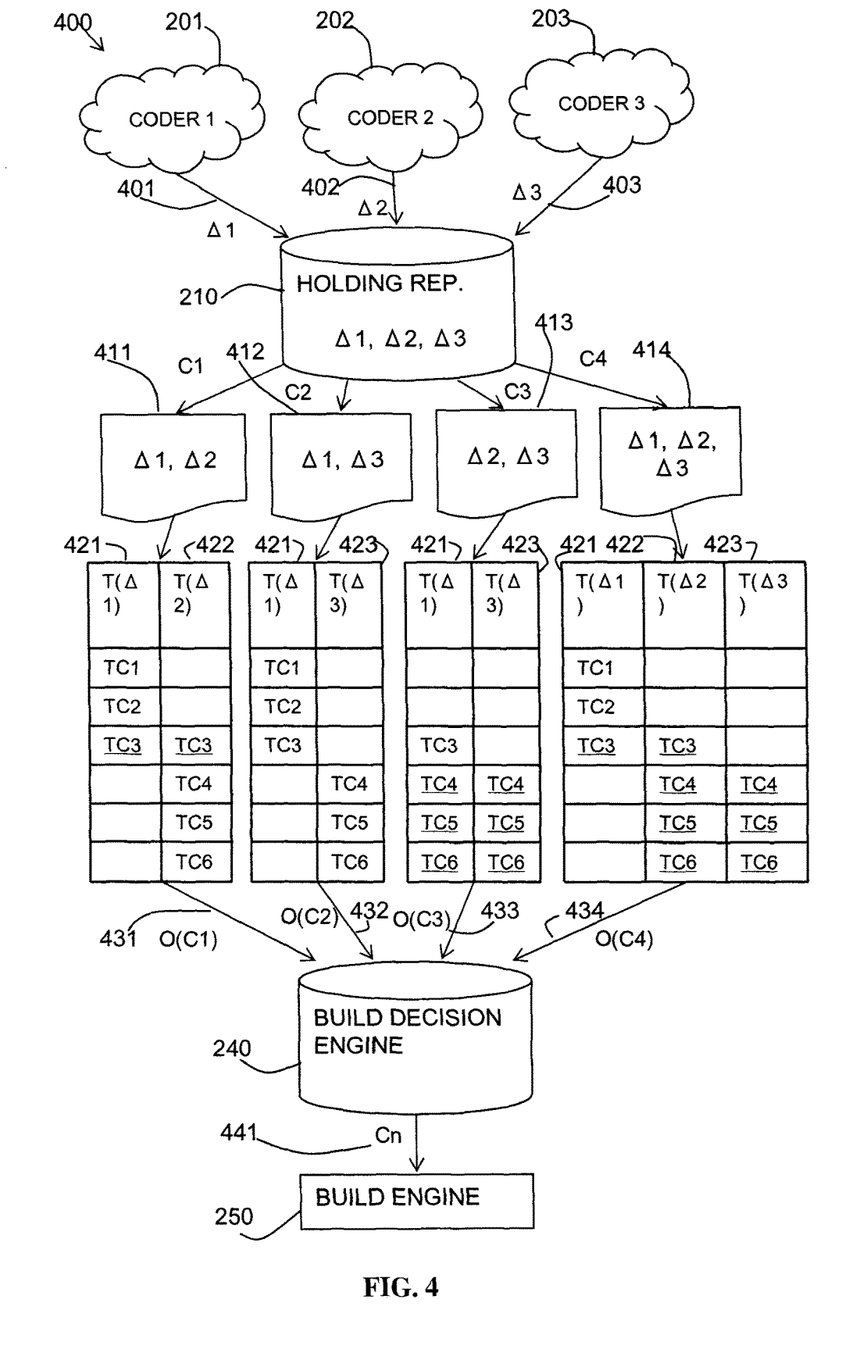
FIG. 4 is a schematic diagram showing a flow of an embodiment of a method in accordance with the present invention in relation to the system components.

Referring to FIG. 4, a schematic diagram 400 shows an example embodiment of the described method in conjunction with system components. The system components shown in FIG. 2 have the same reference numbers.

Coders 201, 202, 203 may feed changesets, $\Delta 1$ 401, $\Delta 2$ 402, $\Delta 3$ 403, into a holding repository 210. For each changeset $\Delta n$ 401-403, a set of test cases [T($\Delta n$)] 421-423 may be determined that exercise that changeset.

A full set of repository possible build combinations C1 411, C2 412, C3 413, C4 414 may be determined including the changesets $\Delta n$ 401-403. In this example, the build combinations may include C1=($\Delta 1$, $\Delta 2$), C2=($\Delta 2$, $\Delta 3$), C3=($\Delta 2$, $\Delta 3$), C4=($\Delta 1$, $\Delta 2$, $\Delta 3$).

For each combination Ci 411-413 of changesets, the method may calculate the overlap O(Ci) 431, 432, 433, 434 between the relevant test cases T($\Delta n$) 421-423 covering the contributing changesets $\Delta n$ 401-403.

In this example, the overlaps are underlined in FIG. 4 and are as follows: O(C1)=TC3, O(C2)=null, O(C3)=TC4,TC5, TC6, O(C4)=TC4,TC5,TC6.

The overlap data O(Ci) 431-434 may be sent to a build decision engine 240 which decides the most appropriate build Cn 441 combining changesets $\Delta n$.

The build decision engine may select the most efficient pseudo-independent build combinations. In the example above shown in FIG. 4, the combination of C2 may be chosen as there is null overlap.

Existing products focus on how to make continuous integration a reality, rather than on how to cope better when it is not a reality. The described solution may combine code-coverage tools with combined build selections rather than with targeted testing.

This solution does not seek to find new defects which are otherwise missed using conventional testing techniques. Instead, it provides a mechanism by which defects can be found earlier and more cheaply—better supporting the vision of "continuous integration" advocated by agile development approaches.

The described method is designed to provide coders cheap and early confidence that their changes work "independently" of other changesets. Once this has been proven, the changes can be delivered to a "full" production stream, and built/tested using conventional technologies.

Overall this method is cheap and reliable as only defects resulting from interacting changesets will remain in production builds, which are typically very expensive to debug and diagnose.

With standard build/test approaches, if a build fails it is very difficult to identify which changeset(s) cause the failures. Therefore, diagnostics have to be run and analyzed, often requiring expensive recreates of the test, in order to dig down into which changeset caused the issue, and hence which line(s) of code to change to fix the failures. With pseudo-independence, a much faster indication is obtained of which changeset caused the failures, giving developers a head start on localizing where the bug is.

A test centric view of a changeset is provided which allows for multiple changes to the same file(s) regardless of merging so long as the changes are covered by separate tests.

Compilation (generation of builds) is guarded on test coverage overlap and not test outcome. As the overlap may be calculated before the build and tests are run, time is not spent building changesets and running tests before realizing there is a conflict. This enables useful builds and test to be carried out.

Failures may be assigned to an owner quickly based on known coverage thus removing the need for 'up front' failure analysis.

A method and system are provided for testing of combined code changesets in a software product. The method may include: proposing one or more combinations of two or more changesets, wherein a changeset is a set of changes to the software product submitted by a single developer source; for each combination, calculating an interaction between changesets; and selecting a combination for building and testing having a minimum interaction between changesets.

According to a first aspect of the present invention there is provided a method for testing of combined code changesets in a software product, comprising: proposing one or more combinations of two or more changesets, wherein a changeset is a set of changes to the software product submitted by a single developer source; for each combination, calculating an interaction between changesets; and selecting a combination for building and testing having a minimum interaction between changesets.

The method may include: determining if there is sufficient building and testing capacity to test a changeset individually; if so, building and testing the changeset individually; if not, carrying out the steps defined in claim 1.

Calculating an interaction between changesets may use code coverage techniques. Calculating an interaction between changesets may include: determining a set of test cases that exercise each changeset; and determining the overlap of test cases in each proposed build combination.

Selecting a combination for building and testing may include: determining a combination having a minimum interaction for a maximum number of changesets in the combination.

The method may include building the software product including the combination of changesets and carrying out a collective set of tests for testing the changesets of the combination. If the collective set of tests includes an integration test case exercising more than one changeset, the method may give the integration test case priority in the collective set of tests.

If the software product passes the collective set of tests, the method may treat the results as if each of the changesets in the combination had been tested individually.

The method may include highlighting potential interactions in a combination before testing the software product.

The method may further include prioritizing combinations for testing with no interaction between changesets.

According to a second aspect of the present invention there is provided a system for testing of combined code changesets in a software product, comprising: a combination component for proposing one or more combinations of two or more changesets, wherein a changeset is a set of changes to the software product submitted by a single developer source; an interaction calculating component for calculating an interaction between changesets in each combination; and a build decision engine for selecting a combination for building and testing having a minimum interaction between changesets.

The system may include a resource determining component for determining if there is sufficient building and testing capacity to test a changeset individually.

The interaction calculating component may use code coverage techniques. The interaction calculating component may include a test calculating component for determining a set of test cases that exercise each changeset and determining the overlap of test cases in each proposed build combination.

The build decision engine for selecting a combination for building and testing may include a data collation component for determining a combination having a minimum interaction for a maximum number of changesets in the combination.

The system may include a build and test component for building the software product including the combination of changesets and carrying out a collective set of test for testing of the changesets of the combination.

The build and test component may determine if the collective set of tests includes an integration test case exercising more than one changeset, and giving the integration test case priority in the collective set of tests.

The interaction calculating component may highlight potential interactions in a combination before testing the software product.

The build decision engine may be for prioritizing combinations for testing with no interaction between changesets.

According to a third aspect of the present invention there is provided a computer program product for testing of combined code changesets in a software product, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of any of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of providing an alternative strategy by which more efficient use is made of existing build and test capabilities providing users with "pseudo-independent" builds, which they can treat as containing only their fix. Therefore, the invention solves the problem but with much reduced cost than existing solutions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Improvements and modifications can be made to the foregoing without departing from the scope of the present invention.

What is claimed is:

1. A method for testing changesets in a software product, the method comprising:
   determining, by one or more processors, whether there is sufficient building and testing capacity to test a single changeset individually, wherein a changeset is a set of changes to a software product; and
   in response to determining that there is not sufficient building and testing capacity to test the single changeset individually:
      selecting, by one or more processors, a first combination of changesets from multiple changesets;
      calculating, by one or more processors and for each combination of two or more changesets from the multiple changesets, an interaction between changesets in said each combination, wherein the interaction is an overlapping of code found in two or more changesets;
      determining, by one or more processors, that the first combination of changesets has a lower amount of overlapping of code than any other combination of changesets from the multiple changesets; and
      selecting, by one or more processors, the first combination of changesets for building and testing, wherein said first combination of changesets has the lower amount of overlapping of code than any other combination of changesets from the multiple changesets; and building and testing, by one or more processors, the first combination of changesets.

2. The method of claim 1, wherein the multiple changesets are submitted by a single developer source.

3. The method as claimed in claim 1, further comprising:
building and testing, by one or more processors, both the single changeset and the first combination of changesets, wherein the first combination of changesets is built and tested before the single changeset is built and tested.

4. The method as claimed in claim 1, wherein calculating an interaction between changesets uses code coverage techniques.

5. The method as claimed in claim 1, wherein calculating an interaction between changesets comprises:
creating, by one or more processors, two or more proposed build combinations of three or more changesets;
executing, by one or more processors, a set of test cases that test each of the three or more changesets under a predefined set of test scenarios; and
determining, by one or more processors, an overlap of test cases in each of the proposed build combinations.

6. The method as claimed in claim 1, wherein selecting the first combination of two or more changesets for building and testing comprises:
determining, by one or more processors, a combination of two or more changesets having less than a predetermined maximum interaction for more than a predetermined minimum number of changesets in the combination.

7. The method as claimed in claim 1, further comprising:
building, by one or more processors, the software product to include the combination of two or more changesets; and
executing, by one or more processors, a collective set of tests for testing the changesets of the combination of two or more changesets in the software product.

8. The method as claimed in claim 7, further comprising:
in response to the collective set of tests including an integration test case exercising more than one changeset, assigning, by one or more processors, execution priority to the integration test case over other tests in the collective set of tests.

9. The method as claimed in claim 7, further comprising:
in response to the software product passing the collective set of tests, reporting, by one or more processors, each result of the collective set of tests as if each of the changesets in the combination had been tested individually.

10. The method as claimed in claim 1, further comprising:
identifying and highlighting, by one or more processors, potential interactions between changesets before testing the software product.

11. The method as claimed in claim 1, further comprising:
prioritizing, by one or more processors, for testing combinations of changesets that have no overlapping of code.

12. A computer program product for testing combined code changesets in a software product, the computer program product comprising a computer readable storage medium having program code embodied therewith, wherein the computer readable storage medium is not a transitory signal per se, and wherein the program code is readable and executable by a processor to perform a method comprising:

determining whether there is sufficient building and testing capacity to test a single changeset individually, wherein a changeset is a set of changes to a software product; and
in response to determining that there is not sufficient building and testing capacity to test the single changeset individually:
selecting a first combination of changesets from multiple changesets;
calculating, for each combination of two or more changesets from the multiple changesets, an interaction between changesets in said each combination, wherein the interaction is an overlapping of code found in two or more changesets;
determining that the first combination of changesets has a lower amount of overlapping of code than any other combination of changesets from the multiple changesets; and
selecting the first combination of changesets for building and testing, wherein said first combination of changesets has the lower amount of overlapping of code than any other combination of changesets from the multiple changesets; and
building and testing, by one or more processors, the first combination of changesets.

13. The computer-program product of claim 12, wherein the method further comprises:
in response to the software product passing the collective set of tests, reporting each result of the collective set of tests as if each of the changesets in the combination had been tested individually.

14. The computer-program product of claim 12, wherein the method further comprises:
identifying and highlighting potential interactions between changesets before testing the software product.

15. The computer program product of claim 12, wherein calculating an interaction between changesets uses code coverage techniques.

16. The computer program product of claim 12, wherein calculating an interaction between changesets comprises:
creating two or more proposed build combinations of three or more changesets;
executing a set of test cases that test each of the three or more changeset under a predefined set of test scenarios; and
determining an overlap of test cases in each of the proposed build combinations.

17. The computer program product of claim 12, wherein selecting the first combination of two or more changesets for building and testing comprises:
determining a combination of two or more changesets having a predetermined minimum interaction for a predetermined maximum number of changesets in the combination.

18. The computer program product of claim 12, wherein the method further comprises:
building the software product to include the combination of two or more changesets; and
executing a collective set of tests for testing the changesets of the combination of two or more changesets in the software product.

19. The computer program product of claim 12, wherein the method further comprises:
identifying and highlighting potential interactions between changesets before testing the software product.

20. A computer system comprising:
a hardware processor, a computer readable memory, and a computer readable storage medium;
first program instructions to determine whether there is sufficient building and testing capacity to test a single changeset individually, wherein a changeset is a set of changes to a software product; and
second program instructions to, in response to determining that there is not sufficient building and testing capacity to test the single changeset individually:
select a first combination of changesets from multiple changesets;
calculate, for each combination of two or more changesets from the multiple changesets, an interaction between changesets in said each combination, wherein the interaction is an overlapping of code found in two or more changesets;
determine that the first combination of changesets has a lower amount of overlapping of code than any other combination of changesets from the multiple changesets; and
select the first combination of changesets for building and testing, wherein said first combination of changesets has the lower amount of overlapping of code than any other combination of changesets from the multiple changesets; and
third program instructions to build and test the first combination of changesets; and
wherein
the first, second, and third fourth program instructions are stored on the computer readable storage medium and executed by the hardware processor via the computer readable memory.

* * * * *